United States Patent [19]
Zimmer et al.

[11] Patent Number: 5,342,120
[45] Date of Patent: Aug. 30, 1994

[54] ROAD VEHICLE HYDRAULIC SERVICE-BRAKE SYSTEM AND ACTIVATION PROCESS

[75] Inventors: Richard Zimmer, Fellbach; Wolfgang Gautsch, Köngen; Armin Müller, Backnang; Rainer Freitag, Nürtingen, all of Fed. Rep. of Germany

[73] Assignee: Mercedes-Benz AG, Fed. Rep. of Germany

[21] Appl. No.: 140,973

[22] Filed: Oct. 25, 1993

Related U.S. Application Data

[63] Continuation of Ser. No. 795,864, Nov. 22, 1991, abandoned.

[30] Foreign Application Priority Data

Nov. 24, 1990 [DE] Fed. Rep. of Germany ....... 4037468

[51] Int. Cl.$^5$ ............................................. B60T 8/34
[52] U.S. Cl. ............................. 303/113.2; 303/113.4; 303/116.2
[58] Field of Search ............... 303/100, 103, 93, 113.1, 303/113.2, 113.4, 116.1, 116.2; 364/426.02, 426.03

[56] References Cited

U.S. PATENT DOCUMENTS

| | | |
|---|---|---|
| 4,898,430 | 2/1990 | Becker-Endrigkeit et al. .... 303/113 TR X |
| 4,902,075 | 2/1990 | Uno et al. . |

FOREIGN PATENT DOCUMENTS

| | | |
|---|---|---|
| 3824877 | 2/1989 | Fed. Rep. of Germany . |
| 3839178 | 4/1990 | Fed. Rep. of Germany . |
| 4009640 | 6/1991 | Fed. Rep. of Germany . |
| 2182991 | 5/1987 | United Kingdom . |
| 2214253 | 8/1989 | United Kingdom . |
| 2214254 | 8/1989 | United Kingdom .... 303/113 TR X |
| 2217413 | 10/1989 | United Kingdom . |
| 2230068 | 10/1990 | United Kingdom . |

*Primary Examiner*—Robert J. Oberleitner
*Assistant Examiner*—Lee W. Young
*Attorney, Agent, or Firm*—Evenson, McKeown, Edwards & Lenahan

[57] ABSTRACT

A vehicle is equipped both with an anti-lock system working on the return-flow principle and with a drive-slip control device working on the differential brake principle, in which the return pump is utilized as an auxiliary pressure source for loading the driven vehicle wheels with brake pressure. In an operational situation requiring drive-slip control, a pump working at a low pressure level is actuated, even before the control responds, and conveys brake fluid both into the brake circuit of the driven vehicle wheel and into the brake circuit of the non-driven vehicle wheels, which are shut off from the brake unit of the brake system by, on one hand, an ASR-function control valve and, on the other hand, by an isolating valve. The pre-charge pump of the return pump of the brake circuits of the driven vehicle wheels is used as a low-pressure pump. This pressurization of the brake circuits with a moderate brake pressure causes a compensation of the lifting play and is utilized both for the drive-slip control and for normal braking.

17 Claims, 1 Drawing Sheet

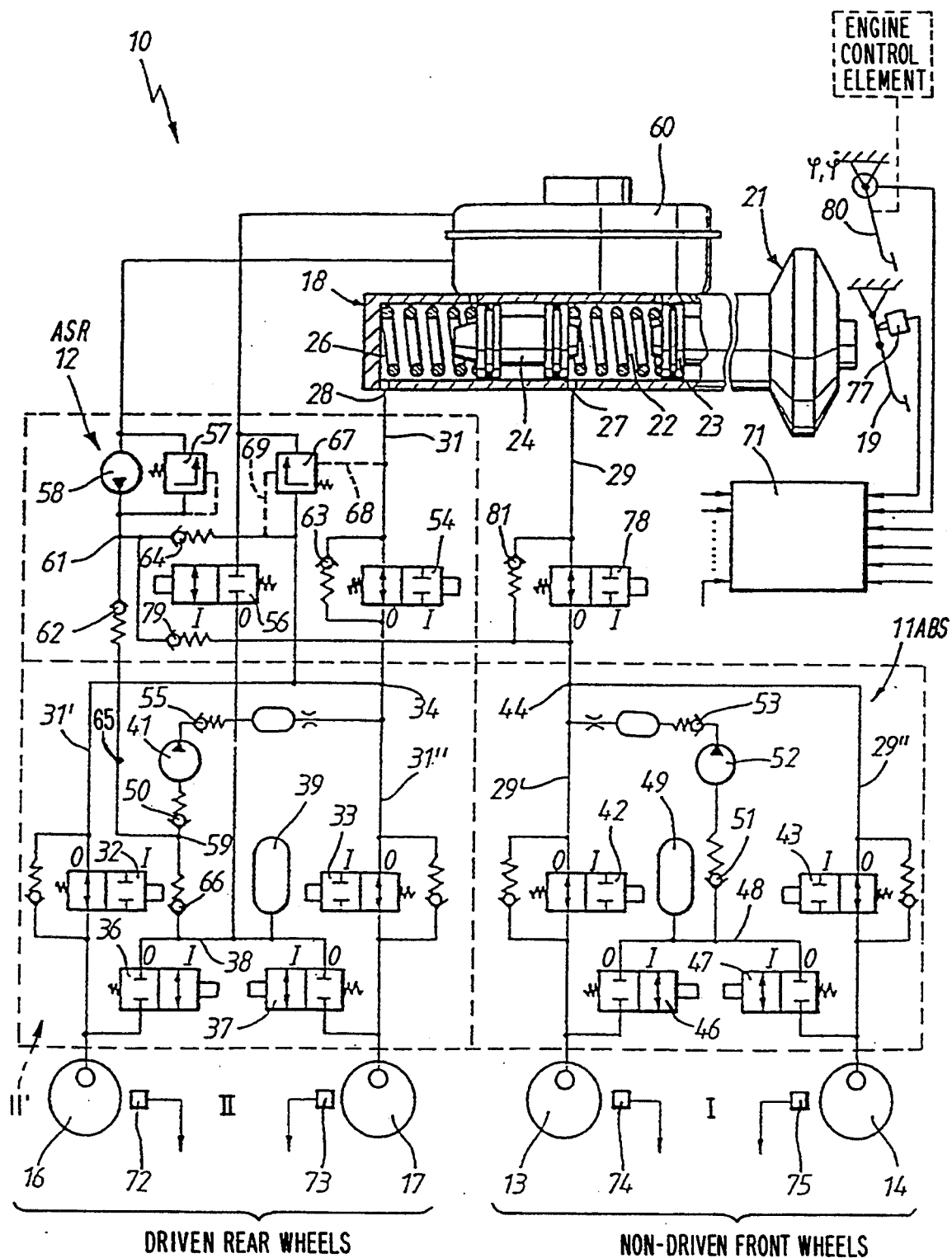

ROAD VEHICLE HYDRAULIC SERVICE-BRAKE SYSTEM AND ACTIVATION PROCESS

This is a continuation of application Ser. No. 07/795,864, filed Nov. 22, 1991 now abandoned.

BACKGROUND AND SUMMARY OF THE INVENTION

The present invention relates to both a system and a process for activating the hydraulic service-brake system of a road vehicle equipped with an anti-lock system (ABS) working on the return-flow principle and with a drive-slip control device (ASR) working on the principle of the differential wheel brake-activation of a driven vehicle wheel tending to spin. The process according to the present invention obtains as rapid a situation-related response as possible of the brake of the driven vehicle wheel when the latter is tending to spin. To this end, when the drive-slip control commences, the main brake-line of the brake circuit of the driven vehicle wheels is shut off from the static master cylinder of the brake system; for the build-up of brake pressure in the brake circuit of the driven vehicle wheels, the return pump provided for this brake circuit and belonging to the anti-lock system configured to work on the return-flow principle is used.

In order to set a specific high pressure level as early as at the commencement of the control, that portion of the main brake-line an its portions branching off towards the wheel brakes, via which the ASR-function control valve is connected to the brake-pressure regulating valves which are assigned individually to the driven vehicles wheels and by way of which brake-pressure build-up, holding and reduction phases both of the drive-slip and of the anti-lock control can be controlled even before the ASR-control commences, is charged to a specific high pressure, the brake-pressure regulating valves are previously changed to their blocking positions, and the return pump is simultaneously activated as a pressure source. This activation of the return pump and changeover of the brake-pressure regulating valves takes place at a moment when the situation requiring control begins to emerge. That is, an electronic control unit detects, via output signals from wheel-speed sensors assigned individually to the vehicle wheels, that the wheel acceleration and/or the drive-slip is beginning to increase and threshold values of the acceleration and/or of the drive-slip are being exceeded. These signals, although not yet requiring a cut-in of the control, nevertheless indicate that control will very soon be needed.

An activation process is shown in from DE 3,839,178 A1. Although this known process is reasonably satisfactory in serving the purpose of ensuring a rapid control response, nevertheless it has the disadvantage that those parts of the main brake-line of the brake circuit of the driven vehicle wheels utilized, as it were, as additional pressure accumulators are pressurized to a very high pressure. Should the control still not commence immediately, but only relatively late, those parts are therefore subjected to very high load. Pressure relief valves sized for a high pressure level and which involve a comparatively high outlay and susceptible to faults consequently thus have to be provided. The brake system has to be protected against damage to the ASR-control valve, by means of which the master cylinder of the brake system is shut off from the main brake-line in the control mode. In other words, central valves provided in the brake master cylinder have to be designed for a high load-bearing capacity so that they cannot be damaged in the event of a pressure surge which could occur as a result of damage to the ASR-control valve, thus necessitating a construction of the brake unit which involves a high outlay.

In addition, the storage capacity of the brake-line portions connected between the ASR-function control valve and the brake-pressure regulating valves is limited and therefore is often insufficient to guarantee, with the control response, also an immediate effective application of the wheel brake or wheel brakes subjected to the control. This can occur especially when the lifting play of the wheel-brake cylinders has become relatively large, which occurs regularly when the brake system has been actuated with only moderate force over a plurality of braking operations, and consequently the pistons of the wheel-brake cylinders have been displaced only within the elastic deformability of their sealing rings acting at the same time as return elements. As a result, relatively long displacement travels of the wheel-cylinder pistons are first necessary in order to apply the brakes effectively. In such instances, an undesirable sluggish response behavior of the drive-slip control then has to be accepted.

An object of the present invention is, therefore, to provide an activation process of the aforementioned type which guarantees both a reliable, rapid response of the drive-slip control independently of the particular lifting play of the brake system and a brake system which allows an automatically controlled use of the process on a road vehicle.

Another object of the present invention is to provide a brake system for a road vehicle suitable for carrying out the improved process.

These objects have been achieved in accordance with the process and system of the present invention, by a process in which, in an operating situation of the vehicle which can be detected by output signals from wheel-speed sensors assigned to driven and nondriven vehicle wheels and which requires a drive-slip control, even before the control responds as a result of the activation of one or more brakes of driven vehicle wheels, at least the brake-line branches leading to the wheel brakes and the wheel brakes of the driven vehicle wheels, connected thereto via brake-pressure regulating valves provided both for the anti-lock control mode and for the drive-slip control mode, are loaded by the outlet pressure of a pump working at a low pressure level of between 10 bar and 20 bar, and at the latest at the activation of this pump, the brake circuit of the driven vehicle wheels is shut off by the ASR-function control valve from the outlet-pressure space assigned to this brake circuit, of the system brake unit of the brake system. In an operating phase of the vehicle initiating a braking operation, at least the brake circuit of the driven vehicle wheels is shut off by the ASR-function control valve and/or the brake circuit of the non-driven vehicle wheels is/are shut off from the respective associated outlet-pressure space of the brake unit, and the brake-line branches leading to the wheel brakes of this brake circuit and the wheel brakes are loaded with the outlet pressure of the low-pressure pump.

The low-pressure loading of the brake circuit of the driven vehicle wheels, even before the drive-slip control, which always commences with a pressure loading of at least one of the wheel brakes of the driven vehicle wheels, ensures that the wheel brake of a vehicle wheel to be subjected to the control at a slightly later moment is already being applied weakly when the control commences. Thus, a pressure build-up by means of the high-pressure pump, initiated thereafter for the control, can become effective immediately, with the result that a very rapid and sensitive response of the control becomes possible.

At the same time, the metering of pressure to the wheel brakes of the driven vehicle wheels can be appropriately controlled by the assigned brake-pressure regulating valves such that first only the wheel brake of that vehicle wheel for which a response of the control is to be expected first is loaded by the outlet pressure of the low-pressure pump. This can be achieved in that the wheel brake of the other driven vehicle wheel is shut off by the brake-pressure regulating valve or valves assigned thereto from the low-pressure pump in the introductory phase of the preliminary pressure build-up and is likewise connected to the low pressure source only after a short delay time of 100 to 200 ms. After that delay time, its wheel brake too is initially applied with a moderate force which still exerts no, or at least no appreciable, braking effect on this wheel. The control signals necessary for this control, in which the brake-pressure regulating valves are solenoid valves, are generated in control-related sequence and combination by the electronic ASR- and ABS-control unit.

A currently preferred embodiment of the process according to the present invention ensures a rapid response of the brakes of the vehicle even during a normal braking, i.e. one which is not subjected to control and which is initiated and controlled by the pedal actuation of the brake unit of the brake system. Especially when all the wheel brakes of the vehicle are loaded with the assistance of the low-pressure pump, this embodiment achieves a minimization of the idle travel of the brake pedal and guarantees that the greatest possible part of the available pedal actuation stroke can be utilized for exerting the brake pressure. This is of considerable advantage in terms of the maximum obtainable braking forces.

Insofar as the process according to the present invention is used for executing control cycles of the drive-slip control, it is, of course, also possible to achieve an additional response sensitivity of the control. Specifically, after a period of time after the expiration of which, the wheels brakes can be assured to be applied weakly as a result of the low-pressure loading, the associated brake-pressure regulating valves are changed over to the blocking position and, in a manner similar to the conventional activation process discussed above, the brake-line portions and branches connecting the ASR-function control valve to the brake-pressure regulating valves of the brake circuit of the driven vehicle wheels are already being loaded by the high outlet pressure of the return pump, utilized as a brake-pressure source, of this brake circuit. This is then applied to the brake-pressure regulating valves even when these are being switched back into the pressure build-up position for the purpose of activating the wheel brake or wheel brakes.

According to another feature of the present invention, a non-return valve is provided to ensure that braking into a drive-slip control operation can be carried out free of delay even when the ASR-function control valve, by means of which the brake unit is shut off from the brake circuit of the driven wheels during the drive-slip control phases, is not immediately changed over at the start of braking into its functional position connecting the brake unit to the main brake-line. A slight delay in the changeover of the ASR-function control valves into its relation to the ASR-function position is even beneficial, in order, if a very high brake pressure was fed into the wheel brake or wheel brakes of the brake circuit of the driven vehicle wheels in the AS-control phase and the driver would like to select a relatively low pressure by way of the brake unit, to prevent reactions on the brake unit which the driver would detect as a recoil force on the brake pedal and which could even lead to an unnecessarily high stress on gaskets within the brake unit.

According to yet another feature of the present invention, even during normal braking, an advantageously rapid response of all the wheel brakes of the vehicle and a minimization of the lifting play or idle travel of the brake pedal are ensured, only after which does the exertion of brake pressure proportional to the actuating force commence.

Other features of the present invention, which can be used alternately or in combination, include an isolating valve which is suitable for shutting off the brake circuit of the non-driven vehicle wheels from the brake unit at the start of braking and the combined form of which affords additional safety in respect of a function-related changeover of the isolating valve.

If only hydraulic control is provided for such an isolating valve, a valve configuration according to another aspect of the present invention ensures in a simple way that, in the introductory phase of a braking operation, first the brake circuit of the driven vehicle wheels and only thereafter the brake circuit of the non-driven vehicle wheels is activated. This feature has the advantages that, in a vehicle driven via the rear wheels, the wheel brakes of the rear-axle brake circuit are first utilized to a greater extent for exerting the brake force than the front-wheel brakes in the introductory phase of braking, as a result, a relatively careful treatment of the front-wheel brakes can be achieved without a loss of exertion of brake force having to be accepted.

It is another advantage of the present invention also with regard to the brake circuit of the non-driven vehicle wheels that a bypass flow path parallel to the isolating valve and with a non-return valve is provided, via which brake pressure can be fed into the brake circuit in the event of a malfunction of the isolating valve.

As a result of a mode of the activation of the low-pressure pump and changeover of the ASR-function control valve and, if appropriate, of the isolating valve into their blocking positions according to still a further aspect of the present invention, a preliminary pressure loading of the brake circuits can be initiated even before the driver actuates the brake pedal. As an indication that braking is to take place, the logical linkage of a signal characteristic of the basic position of the accelerator pedal with a signal characteristic of a minimum driving speed is used because this signal combination occurs with predominant probability only when the driver takes his foot off the accelerator pedal in order subsequently to brake. It is possible in this way t gain up to 200 ms which can be utilized for the preliminary pressure loading of the brake circuits.

In the same situation, an even earlier activation of the low-pressure pump and of the ASR-function control and isolating valves is possible if, instead of a signal characteristic of the end position, a signal indicating a change of position of the accelerator pedal is generated, as provided according to another feature of the system of the present invention.

At all events, it is expedient if an activation of the low-pressure pump and of the ASR-function control valve and, if appropriate, of the isolating valve, which is based in this way on indications, is canceled again after a time period tv. A typical duration of this time period is between 200 ms and 500 ms.

BRIEF DESCRIPTION OF THE DRAWING

These and other objects, features and advantages of the present invention will become more apparent from the following detailed description of a currently contemplated brake system when taken in conjunction with the single drawing figure which schematically shows the brake system and its operation in accordance with the present invention.

DETAILED DESCRIPTION OF THE DRAWING

A hydraulic dual-circuit brake system designated generally by the numeral 10 represents a road vehicle which is equipped both with an anti-lock system (ABS) and with a drive-slip control device (ASR). The ABS is represented by a hydraulic unit designated generally by the numeral 11, and the ASR likewise is represented by a hydraulic unit designated generally by the numeral 12 which, in combination with the subunit 11' assigned to the driven vehicle wheels, of the ABS-hydraulic unit 11, also allows the drive-slip control mode on the driven vehicle wheels. In an actual physical construction of these slip control devices, the two hydraulic units 11 and 12 are combined to form a compact unit.

It is further presupposed that the vehicle under discussion has a rear-axle drive, the wheel brakes 13, 14 of the non-driven front wheels being combined to form a brake circuit I and the wheel brakes 16, 17 of the driven rear wheels being combined to form a rear-axle brake circuit II. The two brake circuits I, II are static brake circuits to which brake pressure is supplied by a brake unit designated generally by the numeral 18 configured as a tandem master cylinder of known type and which can be actuated by a brake pedal 19 via a brake booster 21.

The front-axle brake circuit I is connected to the primary outlet-pressure space 22 of the brake unit 18, which pressure space is delimited by its pressure-rod piston 23 and a floating piston 24 so as to be moveable on both sides in the axial direction. The rear-axle brake circuit II is connected to the secondary outlet-pressure space 26 of the brake unit 18 which is delimited by the floating piston 24 from the primary outlet-pressure space 22 of the brake unit so as to be moveable on one side in a pressure-tight manner. The main brake-lines of the front-axle brake circuit I and of the rear-axle brake circuit II, which are connected respectively to the delivery outlets 27 and 28, respectively, of the primary outlet-pressure space 22 and of the secondary outlet-pressure space 26, are designated respectively by the numerals 29 and 31.

The ABS 11 works on the return-flow principle according to which, in brake-pressure reduction phases of the anti-lock control, brake fluid bled from one or more wheel brakes 13 and/or 14 or 16 and/or 17 subjected to the control is pumped back into the respective outlet-pressure space 22 or 26 of the brake unit 18 assigned to the particular brake circuit I or II, respectively.

The ASR works on the differential brake principle according to which a driven vehicle wheel tending to spin is decelerated again by the activation of its wheel brake 16 or 17 and, if both wheel brakes 16 and 17 tend to spin and therefore have to be braked, the engine torque is reduced, for example by action on at least one of the fuel supply, the ignition and the supply of combustion air.

The brake-pressure regulation valves utilized in the brake circuit II of the driven vehicle wheels both for the anti-lock control and for the drive-slip control are inlet valves 32, 33 which are respectively assigned individually to the rear-wheel brakes 16 and 17 and by way of which are guided the brake-line branches 31' and 31", which start from a branch point 34 of the main brake-line 31 of the rear-axle brake circuit II connected to the secondary outlet-pressure space 26 of the brake unit 18 and via which brake pressure is fed into the rear-wheel brakes 16 and 17, and outlet valves 36 and 37 which are assigned individually to these rear-wheel brakes 16 and 17 and by way of which the wheel brakes 16 and/or 17 of the driven vehicle wheels can be connected individually or jointly to a return line 38 of the rear-axle brake circuit II. Connected to this return line 38 is a low-pressure buffer accumulator 39 configured, for example, as a piston/spring accumulator and which, in brake-pressure reduction phases of the anti-lock control, rapidly receives brake fluid which is bled from the rear-wheel brake or brakes 16 and/or 17 subjected to the control and which is then pumped back by an electrically driven return pump 41 into the main brake-line 31 of the rear-axle brake circuit II or the associated outlet-pressure space 26 of the brake unit 18.

The inlet valves 32, 33 are 2/2-way solenoid valves, of which the basic position 0 is their throughflow position connecting the respective rear-wheel brake 16 or 17 to the main brake-line 31 of the rear-axle brake circuit II, and of which the energized position I is a blocking position uncoupling the respective wheel brake 16 or 17 from the main brake-line 31.

The outlet valves 36, 37 are likewise 2/2-way solenoid valves, of which the basic position 0 is their blocking position, in which the wheel brake or wheel brakes 16 and/or 17 are shut off from the return line 38, and of which the energized position I is in each case a throughflow position, in which the wheel brake or wheel brakes 16 and/or 17 are in communication with the return line 38.

The brake-pressure regulating valves of the front-axle brake circuit I, which are used solely for the anti-lock control, are inlet valves 42, 43, which are similar to the brake-pressure regulating valves of the rear-axle brake circuit II in terms of construction and function and by way of which are guided the brake-line branches 29' and 29" starting from a branch point 44 of the main brake-line 29 of the front-axle brake circuit II connected to the primary outlet pressure 22 of the brake unit 18, and outlet valves 46, 47 which are assigned individually to the respective front-wheel brakes 31, 14 and via which the front-wheel brakes 13 and/or 14 can be connected individually or jointly to a return line 48 of the front-axle brake circuit I. A low-pressure buffer accumulator 49 is connected to the return line 48 which, is connected, via an inlet non-return valve 51, to an electrically driven return pump 52 which is itself connected to the main brake-line 29 of the front-axle brake circuit I via an outlet non-return valve 53.

The inlet and outlet non-return valves 50, 55, corresponding in both constructional and functional terms to the inlet and outlet non-return valves 51, 53 of the return pump 52 of the front-axle brake circuit I, are also provided on the return pump 41 of the rear-axle brake circuit II. These inlet and outlet non-return valves 51, 53 or 50, 55 are, in actual practice, integrated constructionally into the return pumps 52, 41 which are configured as conventional free-piston pumps with a common eccentric drive.

With the above-described hydraulic unit 11 compressing the inlet valves 32, 33, 42 and 43, the outlet valves 36, 37, 46 and 47, the buffer accumulators 39 and 49 and the return pumps 41 and 42 with their inlet and outlet nonreturn valves, an anti-lock control in the manner of individual wheel control is possible in the two brake circuits I and II, so that brake-pressure reduction, brake-pressure holding and brake-pressure rebuild-up phases can be controlled independently of one another on the individual wheel brakes 13, 14 and 16, 17. That is, brake-pressure changes in phase opposition are also possible such that, while brake pressure is being reduced on one of the wheel brakes, the brake pressure is being built up again on another wheel brake.

The hydraulic components which, according to the illustration, are combined in the ASR hydraulic unit and which, in combination with the subunit 11' of the ABS hydraulic unit, perform the drive-slip control function on the driven vehicle wheels in the following manner. By means of an ASR-function control valve 54, an ASR outlet valve 56 and an electrically driven and controllable precharge pump 58, which is equipped with a pressure relief valve 57, brake fluid can be conveyed out of the reservoir 60, in the drive-slip control mode, to the inlet of the return pump 41 of the rear-axle brake circuit II which, in the drive-slip control mode, is utilized as a brake-pressure source. Thus, the delivery outlet 61 of the precharge pump 58 is hydraulically connected to the inlet 59 of the return pump 41 of the rear-axle brake circuit II via a first non-return valve 62 which is loaded in the opening direction by a relatively higher pressure at the outlet 61 of the pre-charge pump 58 than in the further pre-charge line 63.

The ASR-function control valve 54 is inserted between the delivery outlet 28 of the brake unit 18 assigned to the rear-axle brake circuit II and the branch point 34 of the main brake-line 31, from which the brake-line branches 31' and 31" lead. The valve 54 is a 2/2-way solenoid valve, of which the basic position 0 is its throughflow position, in which brake pressure can be fed from the brake unit 18 into the main brake-line 31 and, via the inlet valves 32, 33, into the rear-wheel brakes 16 and 17. Its energized position I, assigned to the ASR control mode, is its blocking position, in which the brake unit 18 is shut off from the rear-axle brake circuit II. There is a brake-pressure loading of one and-/or the other rear-wheel brakes 16 and/or 17 with the outlet pressure of the return pump 41 of the rear-axle brake circuit II, which is utilized in the ASR control mode as an auxiliary pressure source. Brake fluid is fed to the return pump 41 in this operating state from the reservoir 60 by the pre-charge pump 58.

The ASR outlet valve 56 is inserted between the brake-fluid reservoir 60 of the brake unit 18 and the return line 38 or the buffer accumulator 39 connected to the return line 38. The valve 56 is also a 2/2-way solenoid valve but which has a blocking basic position 0 and, and an energized position I, a throughflow position. The ASR outlet valve 56 is switched into its energized position I only in the drive-slip control mode, appropriately for the entire duration of an ASR control cycle, and otherwise remains held in its basic position 0. A non-return valve 63, which is loaded in the opening direction by a relatively higher pressure at the delivery outlet 28 of the brake unit 18 assigned to the rear-axle brake circuit II than in the brake-line branches 31' and 31" of the rear-axle brake circuit II and which otherwise assumes only its blocking position, is connected in parallel with the ASR-function control valve 54 as a further element of the ASR hydraulic unit 12. Non-return valve 63 makes it possible to brake into a drive-slip control cycle even when, at such a moment, the ASR-function control valve 54 still assumes its blocking position assigned to the ASR mode.

The delivery outlet 61 of the pre-charge pump 58 is connected to the branch point 34 of the main brake-line 31 of the rear-axle brake circuit II via a second non-return valve 64 which is loaded in the opening direction by relatively higher pressure at the delivery outlet 61 of the pre-charge pump 58 than in the brake-line branches 31' and 31" of the rear-axle brake circuit II and which is otherwise blocked.

To prevent the possibility that, in the drive-slip control mode, brake fluid will be conveyed by the pre-charge pump 58 into the return line 38 of the rear-axle brake circuit II, a further non-return valve 66 is provided so as to be held in its blocking position by a relatively higher pressure at the inlet 59 of the return pump 41 than in the return line 38.

Furthermore, within the framework of the ASR hydraulic unit, there is a pressure relief valve 67 which is inserted between the branch point 34 of the rear-axle brake circuit II and the brake-fluid reservoir 60 of the brake unit 18 and which limits the maximum valve of the brake pressure active in the drive-slip control mode to a value of around 200 bar. This pressure relief valve 67 is pressure-controlled via control lines 68 and 69, represented by broken lines such that its response threshold is raised by the amount of the brake pressure prevailing at the delivery outlet 28 of the brake unit 18.

During normal braking, i.e. braking not subjected to control, the illustrated basic position 0 of the inlet valves 32, 33 and 42, 43 of the respective rear-axle brake circuit II and of the front-axle brake circuit I and that of the outlet valves 36, 37 and 46, 47 of the respective rear-axle brake circuit II and of the front-axle brake circuit I are utilized both for brake-pressure build-up phases and for brake-pressure reduction phases. During a braking subjected to the anti-lock control, the illustrated basic positions 0 of the inlet and outlet valves are utilized only for brake-pressure build-up phases. Brake-pressure holding phases on the individual wheels of the vehicle are obtained both in the anti-lock and in the drive-slip control by changing over the inlet valve of the particular vehicle wheel tending to lock or spin into its energized blocking position I.

Brake-pressure reduction phases are obtained on a vehicle wheel subjected to the anti-lock control or a driven rear wheel of the vehicle which can be subjected to the drive-slip control, by changing over the outlet valve to its throughflow position I while the respective inlet valve is held in the blocking position I or changed over thereto.

The control signals, necessary in a control-related sequence and combination therefore, for the inlet and outlet valves and for driving the return pumps 51, 52 of the ABS hydraulic unit 11 and, in the event of a control cycle of the drive-slip control, for the pre-charge pump 58, the ASR-function control valve 54 and the ASR outlet valve 56 of the ASR hydraulic unit are transmitted by an electronic control unit 71 which is assigned to the two modes of the slip control. The unit 71 generates these control signals from processing known criteria according to algorithms involving output signals containing information on the dynamic behavior of the vehicle wheels in terms of level and/or frequency and from wheel-speed sensors 72, 73, 74, 75 assigned individually to the vehicle wheels, and of the output signal of the brake-light switch 77. These signals are sent as input signals to this electronic control unit 71.

Furthermore, the electronic control unit 71 is configured such that, over and above the control of the antilock and drive-slip control functions, during a braking operation initiated by the driver as a result of the actuation of the brake pedal 19, it also performs the functions explained below which will also be used to explain the necessary relevant modifications of the control unit 71. The actual implementation of the unit 71, along with the knowledge of the functions mentioned, is within the skill of a person working in the art of electronic circuitry.

For present discussion, the brake-light switch 77 is path-dependent responsive to emit an output signal, occurring as a high-level voltage signal, after the brake pedal 19 has executed only an initial portion of its maximum possible actuating stroke corresponding to a small fraction of the maximum. This initial portion will also be clearly smaller than the idle stroke of the pedal 19 which is brought about because a pressure build-up in the outlet-pressure spaces 22 and 26 of the brake unit 18 can take place only after the pistons 23 and 24 have been displaced so far that, for example, central valves, which are arranged on the pistons and which, in the basic position of the pistons 23 and 24, make communicating connection between the outlet-pressure spaces 22 and 26, respectively, and the reservoir 60, have had to execute their closing strokes before a brake-pressure build-up in the brake unit 18 itself can take place.

When the brake-light switch output signal occurs, the electronic control unit 71 generates a first output signal, by means of which the pre-charge pump 58 is activated. Simultaneously, a second output signal is generated, by means of which the ASR-function control valve 54 is changed over to is blocking position I. The pre-charge pump 58 now conveys brake fluid out of the reservoir 60 via, on one hand, the first non-return valve 62 and the preliminary pressure line 65 to the return pump 41 of the brake circuit II of the driven vehicle wheels and, on the other hand, via the second outlet non-return valve 64 into the portion of the main brake-line 31 starting from the ASR-function control valve 54 and the brake-line branches 31' and 31" which start from branch point of the main brake-line 31 and in which now builds up a preliminary brake pressure. The maximum value of the preliminary brake pressure is limited by the pressure relief valve 57 connected in parallel to the pre-charge pump 58 to an amount between 10 and 15 bar. This pressure is built up, without brake fluid having to be displaced for this purpose out of the outlet-pressure space 26 of the tandem master cylinder 18, and is sufficient to compensate the lifting play of the wheel-cylinder pistons (not shown) and to press the brake jaws and brake linings of the wheel brakes 16 and 17, e.g. disc brakes, with moderate force against the brake discs, without an appreciable braking effect initially being exerted.

The activation of the pre-charge pump 58 and the control of the ASR-function control valve 54 into its blocking position I are maintained for a time period ta. The duration of this time period is sufficiently long to ensure that, after this time period has expired, it can be assumed that, if the driver actuates the brake pedal 19 with the force and speed characteristic of conventional braking, the brake pressure at the delivery outlets 27 and 28 of the brake unit 18 corresponds at least to the preliminary pressure achieved by the preliminary filling of the rear-axle brake circuit II. After this time period ta, the control of the ASR-function control valve 54 is canceled again, so that this is once more switched back into its basic position 0, namely its throughflow position, and the delivery outlet 28 of the brake unit 18 assigned to the rear-axle brake circuit II is connected via the ASR-function control valve 54 to the portion of the main brake-line 31 and to the brake-line branches 31' and 31" of the rear-axle brake circuit II leading from the valve 54.

If, before this switching back of the ASR-function control valve 54, the outlet pressure of the brake unit 18 occurring at the delivery outlet 28 was already higher than the preliminary pressure fed into the rear-axle brake circuit by the pre-charge pump 58, then the outlet pressure of the brake unit is fed via the non-return valve 63 into the further-leading portion of the main brake-line 31 of the rear-axle brake circuit II and its brake-line branches 31' and 31", while the ASR-function control valve 54 still assumes its blocking position I. This bypass of the ASR-function control valve 54 can, in principle, remain held in its blocking position for a relatively long time period ta.

The outlet pressure of the pre-charge pump 58 limited in amount by the pressure relief valve 57 is calculated to be sufficiently high to ensure that the brake linings of the wheels brakes 16 and 17, assumed here to be disc brakes, are applied as a result of a displacement of the pistons of the wheel-brake cylinders to the brake discs and pressed with moderate force thereagainst, but without the exertion of an appreciable braking force which, if the driver wanted to increase the brake pressure only very slowly (and therefore the outlet pressure of the brake unit would reach the already connected pressure only after a relatively long period of time), could contribute to unnecessary wear.

Also, in the event of a response of the drive-slip control on the brake circuit II of the driven vehicle wheels, a signal is generated to cause the activation of the pre-charge pump 58, and an output signal of the electronic control unit 71 is generated to bring about the changeover of the ASR-function control valve 54. Consequently, the above-mentioned preliminary filling of the rear-axle brake circuit is obtained, even before the wheel brake or wheel brakes 16 and/or 17, which are to be activated for the purpose of the drive-slip control, should be selected and loaded with the outlet pressure of the return pump 41 by the cut-in of the return pump 41 of the rear-axle brake circuit II, and, if appropriate, the changeover of the inlet valve 32 or 33 of that wheel brake 16 or 17 which is not to be activated. For the drive-slip control also, the preliminary filling of the brake circuit II of the driven vehicle wheels is advantageous in order to achieve as rapid a response as possible of the drive-slip control.

The present invention achieves on the front-axle brake circuit I, which in the illustrated embodiment described herein is the brake circuit of the non-driven vehicle wheels, a preliminary filling, for reducing the lifting play of the brake system, of the portion of the main brake-line 29 branching off from the branch point 44 to the wheel brakes 13 and 14 and of the brake-line branches 29' and 29" and the wheel-brake cylinders of the wheel brakes 13 and 14. To this end, there is provided an isolating valve 78 similar in construction and function to the ASR-function control valve 54 of the rear-axle brake circuit II. The isolating valve 78 is a 2/2-way solenoid valve which can be changed over from its basic position 0, namely the throughflow position, into its energized blocking position I by a signal generated by the electronic control unit 71 together with the control signal for the ASR-function control valve. The delivery outlet 61 of the pre-charge pump 58 is connected, via a third non-return valve 64, to the branch point 44 of the main brake-line 29 of the front-axle brake circuit I, so that this circuit can likewise be loaded with the outlet pressure of the pre-charge pump 58 as a preliminary pressure with the activation of the latter.

The isolating valve 78 is bridged by a bypass formed by a non-return valve 81 similar to the non-return valve 63 of the rear-axle brake circuit I, insofar as, should the isolating valve 78 still be in its blocking position when the pressure at the outlet 27 of the brake unit 18 is higher than the preliminary pressure previously fed into the front-axle brake circuit, the outlet pressure of the brake unit 18 can be fed into the front-wheel brakes 13 and 14 by way of this bypass.

In order to achieve an activation of the pre-charge pump 58 and a changeover of the ASR-function control valve 54 and of the isolating valve 78 which are as early as possible in the event of a braking operation, these functional elements can also be controlled by other signals generated as a high-probability indication of the occurrence of a situation requiring braking. Suitable signals for this and from the logical linkage of which a situation requiring braking can be recognized are, for example, as follows: (a) a signal which indicates that the accelerator pedal 80 and/or a control element (for example the throttle flap of the engine) coupled thereto in terms of movement is in the basic position, and (b) a signal which indicates that the vehicle speed is relatively high, for example, higher than 70 km/h.

An operating situation of a vehicle characterized by these signals indicates with high probability that the driver, after taking his foot off the accelerator pedal at a relatively high vehicle speed, will very soon also brake. A logical AND link of the two signals therefore may be appropriate for generating an activation signal for the pre-charge pump 58 and changeover signals for the ASR-function control valve 54 and isolating valve 78.

The same situation can also be detected if the accelerator pedal 80 is equipped with a position transmitter generating output signals which are characteristic of the particular position of the accelerator pedal and from the change of which in reaction to a rapid removal of the foot from the accelerator pedal at a relatively high speed it can likewise be concluded that the driver intends subsequently to brake because such a position-change signal occurs even before the accelerator pedal 80 reaches its basic position. Consequently, the activation of the pre-charge pump 58 and the changeover of the valve 54 and, if appropriate, valve 78 can be triggered even earlier. It is also expedient if the decrease of a signal triggered by the removal of the foot from the accelerator pedal and controlling the ASR-function control valve 54 and/or the isolating valve 78 into their position(s) is delayed relative to the decrease of the signal activating the low-pressure pump 58 by a time period tv, the typical durations of which are between 200 ms and 500 ms, in order to ensure that the driver has sufficient time to transfer his foot from the accelerator pedal 80 to the brake pedal 19. A suitable signal which accomplishes the foregoing is, for example, one that (c) a signal which indicates that the engine speed and/or the speed of the driven vehicle wheels experiences a reduction of which the amount is greater than a predetermined threshold value.

A situation characterized by these signals (a), (b), and/or (c) is, in particular, one in which the driver would obviously wish to reduce the vehicle speed and it can therefore be expected that the driver, after removing his foot from the accelerator pedal which resumes its basic position, will also actuate the brake.

The same situation can also be detected if the accelerator pedal is equipped with a position transmitter generating output signals which are characteristic of the particular position of the accelerator pedal and from the change of which in reaction to a rapid removal of the foot from the accelerator pedal at a relatively high speed, it can likewise be concluded that braking will subsequently take place.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A brake system for activating a vehicle hydraulic service-brake system, comprising a vehicle anti-lock system operable in accordance with a return-flow principle, a drive-slip control device operable in accordance with a differential brake principle, wheel brakes of driven vehicle wheels constituting a first brake circuit, wheel brakes of non-driven vehicle wheels constituting a second brake circuit, a return pump operatively arranged in the anti-lock system to function as an auxiliary pressure source for a drive-slip control mode and operatively associated with the first brake circuit of the driven vehicle wheels, a pre-charge pump configured to work at a low outlet-pressure level for supplying an inlet of the return pump with brake fluid from a reservoir of the service-brake system, a brake-light switch configured as a position-sensitive switch member to transmit an output signal as the brake pedal of the brake system is shifted out of a basic position, and an electronic control unit configured and operatively connected with the brake system and with vehicle wheel-speed sensors to detect, via output signals from the sensors, occurrence of at least one of the output signal of the brake-light switch and development and then commencement of a vehicle operational situation requiring the drive-slip control mode, and to trigger an output signal activating the pre-charge pump and controlling a drive-slip control-function control valve into a blocking position, at least for a time period sufficient for generating maximum outlet pressure of the pre-charge pump and corresponding at least to a period of time after which, in the event of a brake actuation taking place with average pedal force and speed of pedal adjustment, the wheel brakes are applied, wherein an isolating valve is operatively arranged for shutting off a portion of a main brake-line of the second brake circuit which leads to a branch point thereof, for at least the time period, from a delivery outlet of a brake unit assigned to the second brake circuit, and a delivery outlet of a low pressure pump is connected to the branch point of the second brake circuit, by way of the portion of the main brake-line connecting the branch point to the isolating valve, via a non-return valve which is loaded in an opening direction by a relatively higher pressure at the delivery outlet of the low-pressure pump than in this portion of the main brake-line.

2. The system according to claim 1, wherein a bypass flow path leading via a non-return valve for the drive-slip control-function control valve is loaded in an opening direction by a relatively higher pressure at an outlet of the brake unit than in a brake-line portion leading from the drive-slip control-function control valve to a branch point of a main brake-line of the first brake circuit of the driven vehicle wheels.

3. The system according to claim 1, wherein the isolating valve is a 2/2-way solenoid valve, of which a basic position is a throughflow position connecting the delivery outlet of the brake unit to the branch point of the main brake-line of the second brake circuit of the non-driven vehicle wheels and configured to be controlled, jointly with the drive-slip control-function control valve, into a blocking energized position by an output signal from the electronic control unit.

4. The system according to claim 3, wherein a bypass flow path leading via a non-return valve for the drive-slip control-function control valve is loaded in an opening direction by a relatively higher pressure at an outlet of the brake unit than in a brake-line portion leading from the drive-slip control-function control valve to a branch point of a main brake-line of the first brake circuit of the driven vehicle wheels.

5. The system according to claim 1, wherein the isolating valve of the first brake circuit of the non-driven vehicle wheels is a hydraulically-controlled 2/2-way valve configured to be controlled out of a blocking basic position into a throughflow position by the outlet pressure of the brake unit.

6. The system according to claim 5, wherein a bypass flow path leading via a non-return valve for the drive-slip control-function control valve is loaded in an opening direction by a relatively higher pressure at an outlet of the brake unit than in a brake-line portion leading from the drive-slip control-function control valve to a branch point of a main brake-line of the first brake circuit of the driven vehicle wheels.

7. The system according to claim 5, wherein a control pressure, at which the isolating valve changes over to the throughflow position, satisfies the relation $$Pmax < Ps < 1.3Pmax,$$

with Pmax denoting the maximum outlet pressure of the low-pressure pump and Ps preferably being selected from the range $$1.1Pmax < Ps < 1.3Pmax.$$

8. The system according to claim 7, wherein a bypass flow path leading via a non-return valve for the drive-slip control-function control valve is loaded in an opening direction by a relatively higher pressure at an outlet of the brake unit than in a brake-line portion leading from the drive-slip control-function control valve to a branch point of a main brake-line of the first brake circuit of the driven vehicle wheels.

9. The system according to claim 1, wherein a bypass flow path in arranged parallel to the isolating valve and leads, via a non-return valve which is loaded in an opening direction by a relatively higher pressure at the outlet of the brake unit than in the portion of the main brake-line, from the isolating valve to the branch point of the second brake circuit of the non-driven vehicle wheels.

10. The system according to claim 9, wherein the isolating valve is a 2/2-way solenoid valve, of which a basic position is a throughflow position connecting the delivery outlet of the brake unit to the branch point of the main brake-line of the second brake circuit of the non-driven vehicle wheels and configured to be controlled, jointly with the drive-slip control-function control valve, into a blocking energized position by an output signal from the electronic control unit.

11. The system according to claim 10, wherein the isolating valve of the first brake circuit of the non-driven vehicle wheels is a hydraulically-controlled 2/2-way valve configured to be controlled out of a blocking basic position into a throughflow position by the outlet pressure of the brake unit.

12. The system according to claim 5, wherein a control pressure, at which the isolating valve changes over to the throughflow position, satisfies the relation $$Pmax < Ps < 1.3Pmax,$$

with Pmax denoting the maximum outlet pressure of the low-pressure pump and Ps preferably being selected from the range $$1.1Pmax < Ps < 1.3Pmax.$$

13. The system according to claim 1, wherein the isolating valve is a 2/2-way solenoid valve, of which a basic position is a throughflow position connecting the delivery outlet of the brake unit to the branch point of the main brake-line of the second brake circuit of the non-driven vehicle wheels and configured to be controlled, jointly with the drive-slip control-function control valve, into a blocking energized position by an output signal from the electronic control unit.

14. The system according to claim 13, wherein a position transmitter is operatively arranged to monitor the position of the accelerator pedal and to generate an output signal varying continuously in terms of at least one of level and frequency with the operating position of the accelerator pedal, a differentiation stage carries out a time differentiation of the position-transmitter output signal to provide an output signal which is a measure of the speed at which the accelerator pedal is adjusted, and a signal causing the activation of the low-pressure pump and the changeover of at least one of the drive-slip control-function control valve and the isolating valve into a blocking position is already being generated when the speed of the adjustment of the accelerator pedal taking place in reaction to a removal of a driver's foot from the pedal exceeds a predetermined threshold value and the vehicle speed is still higher than a relevant threshold value characteristic of continuous travel.

15. The system according to claim 13, wherein a position transmitter is operatively arranged to monitor the position of the accelerator pedal and to generate an output signal varying continuously in terms of at least one of level and frequency with the operating position of the accelerator pedal, a differentiation stage carries out a time differentiation of the position-transmitter output signal to provide an output signal which is a measure of the speed at which the accelerator pedal is adjusted, and a signal causing the activation of the low-pressure pump and the changeover of at least one of the drive-slip control-function control valve and the isolating valve into a blocking position is already being generated when the speed of the adjustment of the accelerator pedal taking place in reaction to a removal of a driver's foot from the pedal exceeds a predetermined threshold value and the vehicle speed is still higher than a relevant threshold value characteristic of continuous travel.

16. A brake system for activating a vehicle hydraulic service-brake system, comprising a vehicle anti-lock system operable in accordance with a return-flow principle, a drive-slip control device operable in accordance with a differential brake principal, wheel brakes of driven vehicle wheels constituting a first brake circuit, wheel brakes of non-driven vehicle wheels constituting a second brake circuit, a return pump operatively arranged in the anti-lock system to function as an auxiliary pressure source for a drive-slip control mode and operatively associated with the first brake circuit of the driven vehicle wheels, a pre-charge pump configured to work at a low outlet-pressure level for supplying an inlet of the return pump with brake fluid from a reservoir of the service-brake system, a brake-light switch configured as a position-sensitive switch member to transmit an output signal as the brake pedal of the brake system is shifted out of a basic position, and an electronic control unit configured and operatively connected with the brake system and with vehicle wheel-speed sensors to detect, via output signals of the brake-light switch and development and then commencement of a vehicle operational situation requiring the drive-slip control mode, and to trigger an output signal activating the pre-charge pump and controlling a drive-slip control-function control valve into a blocking position, at least for a time period sufficient for generating maximum outlet pressure of the pre-charge pump and corresponding at least to a period of time after which, in the event of a brake actuation taking place with average pedal force and speed of pedal adjustment, the wheel brakes are applied, wherein an isolating valve is operatively arranged for shutting off a portion of a main brake-line of the second brake circuit which leads to a branch point thereof, for at least the time period, from a delivery outlet of a brake unit assigned to the second brake circuit, and a delivery outlet of a low pressure pump is connected to the branch point of the second brake circuit, by way of the portion of the main brake-line connecting the branch point to the isolating valve, via a non-return valve which is loaded in an opening direction by a relatively higher pressure at the delivery outlet of the low-pressure pump than in this portion of the main brake-line wherein a bypass flow path leading via a non-return valve for the drive-slip control-function control valve is loaded in an opening direction by a relatively higher pressure at an outlet of the brake unit than in a brake-line portion leading from the drive-slip control-function control valve to a branch point of a main brake-line of the first brake circuit of the driven vehicle wheels, an isolating valve is operatively arranged for shutting off a portion of a main brake-line of the second brake circuit which leads to a branch point thereof, for at least the time period, from a delivery outlet of a brake unit assigned to the second brake circuit, and a delivery outlet of the low pressure pump is connected to the branch point of the second brake circuit, by way of the portion of the main brake-line connecting the branch point to the isolating valve, via a non-return valve which is loaded in an opening direction by a relatively higher pressure at the delivery outlet of the low-pressure pump than in this portion of the main brake-line.

17. The system according to claim 1, wherein a decrease of the signal triggered by the removal of a driver's foot from the accelerator pedal and controlling at least one of the drive-slip control-function control valve and the isolating valve into a basic position is delayed relative to a decrease of the signal activating the low-pressure pump by a time period generally between about 200 ms and 500 ms.

* * * * *